(12) United States Patent
Shah et al.

(10) Patent No.: US 9,939,910 B2
(45) Date of Patent: Apr. 10, 2018

(54) DYNAMIC EFFECTS PROCESSING AND COMMUNICATIONS FOR WEARABLE DEVICES

(71) Applicant: Intel Corporation, Santa Clara, CA (US)

(72) Inventors: Saurin Shah, Portland, OR (US); Narayan Sundararajan, Palo Alto, CA (US); Manan Goel, Hillsboro, OR (US); Brian K. Vogel, Santa Clara, CA (US); Jason Blanchard, Hillsboro, OR (US); Jason Wright, Santa Cruz, CA (US); Lakshman Krishnamurthy, Portland, OR (US); Swarnendu Kar, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 60 days.

(21) Appl. No.: 14/978,822

(22) Filed: Dec. 22, 2015

(65) Prior Publication Data
US 2017/0177091 A1 Jun. 22, 2017

(51) Int. Cl.
*G06F 3/01* (2006.01)
*G10H 1/00* (2006.01)
*G10H 1/34* (2006.01)

(52) U.S. Cl.
CPC ........... *G06F 3/017* (2013.01); *G10H 1/0008* (2013.01); *G10H 1/0066* (2013.01); *G10H 1/348* (2013.01);
(Continued)

(58) Field of Classification Search
CPC .............. G10H 2240/211; G10H 1/00; G10H 2220/206; G10H 1/0066
See application file for complete search history.

(56) References Cited

U.S. PATENT DOCUMENTS 6,867,361 B2   3/2005  Nishitani et al.
6,897,779 B2   5/2005  Nishitani et al.
(Continued)

OTHER PUBLICATIONS

Karjalainen, Matti, et al., "Virtual Air Guitar", J. Audio Eng. Soc., vol. 54, No. 10—Engineering Reports, Oct. 27, 2008), 964-980.
(Continued)

*Primary Examiner* — Gerald Johnson
(74) *Attorney, Agent, or Firm* — Schwegman Lundberg & Woessner, P.A.

(57) ABSTRACT

Processing techniques and device configurations for performing and controlling output effects at a plurality of wearable devices are generally described herein. In an example, a processing technique may include receiving, at a computing device, an indication of a triggering gesture that occurs at a first wearable device, determining an output effect corresponding to the indication of the triggering gesture, and in response to determining the output effect, transmitting commands to computing devices that are respectively associated with a plurality of wearable devices, the commands causing the plurality of wearable devices to generate the output effect at the plurality of wearable devices. In further examples, output effects such as haptic feedback, light output, or sound output, may be performed by the plurality of wearable devices, associated computing devices, or other controllable equipment.

25 Claims, 6 Drawing Sheets

(52) U.S. Cl.
CPC . *G10H 2220/201* (2013.01); *G10H 2220/321* (2013.01); *G10H 2240/211* (2013.01)

(56) References Cited

U.S. PATENT DOCUMENTS

| | | |
|---|---|---|
| 6,933,434 B2 | 8/2005 | Nishitani et al. |
| 7,135,637 B2 | 11/2006 | Nishitani et al. |
| 2003/0041721 A1 | 3/2003 | Nishitani et al. |
| 2003/0167908 A1* | 9/2003 | Nishitani ................ G10H 1/00 84/723 |
| 2011/0287806 A1 | 11/2011 | Vasudevan et al. |
| 2016/0316542 A1* | 10/2016 | Wein ................ G06K 19/0702 |

OTHER PUBLICATIONS

Ng, Ghee Kyun, et al., "Finger Triggered Virtual Musical Instruments", Journal of Convergence, vol. 4, No. 1, (Mar. 2013), 39-46.

* cited by examiner

DYNAMIC EFFECTS PROCESSING AND COMMUNICATIONS FOR WEARABLE DEVICES

TECHNICAL FIELD

Embodiments described herein generally relate to the communication and processing of data among wearable electronic devices and associated computer systems, and in particular, to the use of wearable electronic devices and associated computer systems for the implementation of dynamic audiovisual and real-world effects.

BACKGROUND

Self-powered wearable electronic devices ("wearable devices") have been adapted to a variety of form factors and are becoming increasingly popular with consumer users. Wearable devices are presently found in shapes such as bands, bracelets, watches, and other form factors that may directly or indirectly attach to a human user. A wearable device may include a variety of specialized circuitry and sensors to detect activity such as motion and acceleration, or personal characteristics of the human user such as a heartbeat. As a result, wearable devices have become widely deployed for collecting data in custom settings such as fitness monitoring. However, many wearable devices are limited in their use cases, and provide limited functionality beyond sensor data collection.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
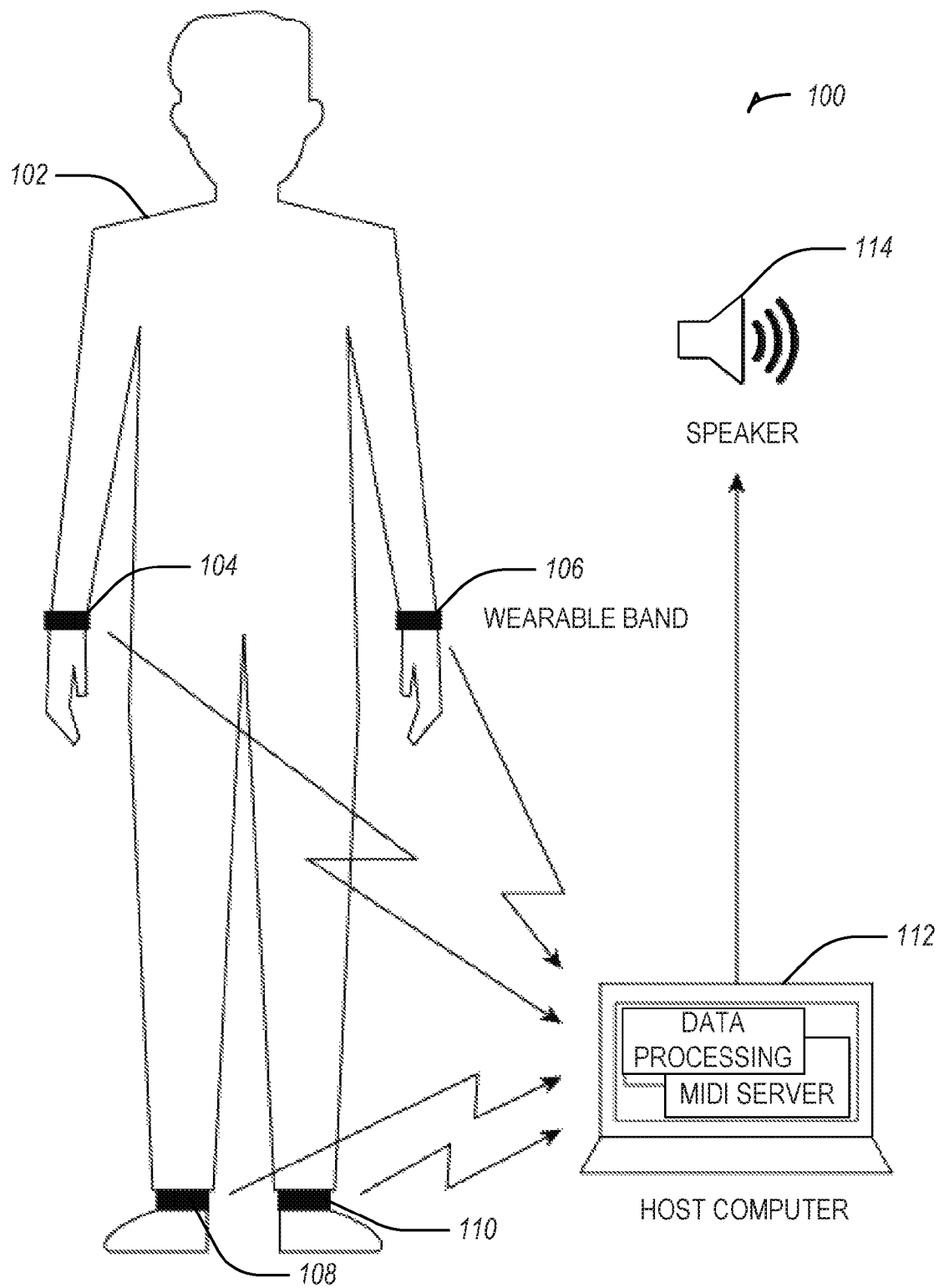
FIG. 1 illustrates a system for controlling media outputs using wearable devices in accordance with an example.

In the following description, methods, configurations, and related apparatuses are disclosed that provide for the communication and processing of data from wearable devices in interactive and unique settings. In contrast to existing wearable devices which typically only communicate data to a paired computing device for processing, the presently described wearable devices and computing systems provide interactivity and the communication of commands among a plurality of devices, computing systems, and users. As a result, a variety of interactive use cases are enabled, including interactive use cases resulting in audiovisual special effects.

In an example implementation, the present techniques and configurations may be used in combination with a music-control or other audio-output platform. For example, a "music by motion" platform may be used with the present techniques to create, compose, play, and communicate music and musical effects. Such music and music effects may be generated from the performance of gestures in the air or using dance and associated movement, providing triggering gesture input to accompanying wearable devices. Also, for example, a user (e.g., a musician) may be enabled to create music or musical effects by triggering gestures with use of a wireless wearable device, freeing the user from physical instruments and allowing the user to move freely during performances. The data that is collected from the sensors of the wearable devices as part of this music-control platform may be communicated to a computing system for further processing; this processing consequently may result in events triggered for other devices or using other controllable systems, such as lighting changes, controlled outputs of smoke, fog, or fireworks, sound and video outputs, or the like.

Also in an example implementation, the present techniques and configurations may be used to control or trigger an event at a plurality of wearable devices. A first wearable device (or a combination of multiple wearable devices) operated by a performer (or multiple performers), for example, may be used to generate a triggering gesture. The triggering gesture may cause the first wearable device to send information about the triggering gesture to a device, such as a computer, a mobile device, a server, a server via another device, or the like. The device receiving the information may determine that the triggering gesture indicates that a certain command or event is to be triggered. The device receiving the information may then trigger the command or event. The command or event may include sending an indication to a plurality of devices, such as mobile phones, to forward the indication to a plurality of corresponding wearable devices. The plurality of corresponding wearable devices may be worn by a single user (e.g., a single user wearing multiple wearable devices) or multiple users (e.g., multiple users each wearing a single or multiple wearable devices). The indication, once received by the plurality of wearable devices, may cause the plurality of wearable devices to output feedback, such as sound, light, or haptic feedback.

FIG. 1 illustrates a system 100 for controlling media outputs using wearable devices in accordance with some embodiments. In an example, the system 100 includes a plurality of wearable devices 104-110 worn by a user 102. The plurality of wearable devices 104-110 may be in communication with a host computer 112, such as directly (e.g., using direct IEEE 802.11 (Wi-Fi), Bluetooth/Bluetooth Low Energy (BLE), or near field communication (NFC) communications), or indirectly (e.g., through a mobile device, such as a smartphone or tablet). The direct or indirect communication may include use of communication methods such as Wi-Fi network connections, cellular network connections, wired connections, Bluetooth/BLE and NFC connections, or the like.

In an example, the host computer 112 may include an app for receiving signals from the plurality of wearable devices 104-110 (e.g., a plurality of wearable devices worn by one performer or among multiple performers). The app may translate signals received to control a speaker 114. The app may be in communication with a server including stored audio files. In an example, the app may run on a mobile device instead of a host computer 112. The host computer 112 may output audio to the speaker 114, based on signals received from the wearable devices 104-110.

The wearable devices 104-110 may, in another example, be worn by a plurality of users, and may be worn by a single user or a plurality of users alongside instruments to create specialized musical or music-triggered events. In an example, the wearable devices 104-110 are used to generate a triggering gesture. The triggering gesture is sent to the host computer 112, which interprets the triggering gesture to determine an instrument and note (e.g., musical pitch, tone, or combinations of pitches or tones, such as a chord) associated with the triggering gesture and optionally the wearable device used to generate the triggering gesture. The instrument and note may include a Musical Instrument Digital Interface (MIDI) file or MIDI command, which may be selected from a MIDI server and sent to the speaker 114.

In an example, the user 102 wears the wearable devices 104-110 on the user's wrist or ankle. The user 102 performs a gesture as if the user is playing a note on an instrument. The wearable device 104-110 may detect the gesture and wirelessly send information to an application on the host computer 112. The application may trigger a MIDI server to send an indication of a specific musical note or musical note characteristic to the speaker 114 based on the information received. In an example, the output effect may be correlated to a specific MIDI note in a musical arrangement, with an identification of musical output characteristic (such as one or more of volume, pitch, notation, sustain, reverb, frequency filtering, pitch bend, or the like) to implement for output of the MIDI note. In another example, the wearable devices 104-110 may include wearable devices worn by dancers, performers playing actual instruments, or augmentations to instruments.

A plurality of users each with one or more wearable devices 104-110 may form an ensemble. Multiple sensors on a single user may also form an ensemble, such as by using a body-area-network. The various examples may connect wirelessly to a central host computer, compose and play music in real-time in a synchronized manner with a very low latency.

Existing systems that attempt to leverage user gestures have high latency, limited gesture types supported, and poor accuracy. The system 100 provides support for multiple gestures with higher accuracy and low latency for instant, real-time audio feedback. The system 100 may detect multiple types of gestures by the user 102 using one or more of the wearable devices 104-110. For example, discrete-type gestures, such as note-on events and continuous variable-type gestures, such as wrist rotation events, may be recognized. These gesture types may enable the user 102 to play notes with different velocity, changing notes/octaves to be played, creating effects such as reverb, vibrato, etc.

The system 100 supports multiple users or an ensemble that may play simultaneously. The system 100 includes redundancy of messages and wireless radio media to ensure delivery of gesture events to the host computer 112. The system 100 may include an extensible functionality platform. Besides music, the system 100 may be used to trigger special effects lighting, smoke/fog, fireworks in a large performance or a concert, or the like. In some examples, these effects may be on other wearable devices, or on other objects including wearable or controllable devices and subsystems (e.g., clothing with embedded wearable devices). Accordingly, in the concert or performance setting, such effects may occur on devices operated by one or more performers, groups of performers, one or more audience members, groups of audience members, and like combinations.

The system 100 includes wearable body sensors, such as the wearable devices 104-110, with gesture detection algorithms and communication channels. The system 100 includes a host computer 112 or mobile device running an app to receive and process gesture events. The host computer 112 or mobile device may map the gesture events to triggered output events, such as MIDI soft instruments, special effects lighting, fireworks, smoke/fog, or the like. The output events may be triggered by an indication sent to a MIDI server application for playing notes on the speaker 114, a lighting controller, a smoke/fog controller, a fireworks controller, etc.

In an example, the wearable devices 104-110 may be worn on the user 102 or integrated into clothing, shoes, or other aspects of the user's body. For example wearable devices 104-110 may be integrated into clothing, apparel, shoes, smart gloves, rings, jewelry, etc. The wearable devices 104-11 may use techniques based on inertial measurement unit (IMU) sensors, flex sensors, proximity sensors, or light-based sensors to detect gestures. The gestures may include air note gestures, stomp gestures, continuous variable wrist rotation gestures, continuous variable arm rotation gestures, or the like. The gestures may be mapped to notes or chords, such as a note-on-low-g, a note-on-high-g for a stomps, a fifth, a third, etc. The wearable devices 104-110 may model various configurations of these gestures. When the user 102 performs a gesture as if hitting a note on an instrument (e.g., playing air guitar), the wearable device 104 may detect the gesture and wirelessly send an event to an application on the host computer 112. The host computer 112 may determine that the gesture corresponds with a chord on a guitar, and may cause the speaker 114 to play the chord using guitar or guitar-simulated timbre and tone.

The host computer 112 may include musical instruments and notes or chords mapped to the triggers using an app, which may act as a configuration tool and MIDI router. The app on the host computer 112 interprets the gesture event from the wearable devices 104-110, and may send MIDI messages to a MIDI server application over a MIDI bus. The app may act as a bridge between the wearable devices 104-110 and music software packages.

Figure 2:
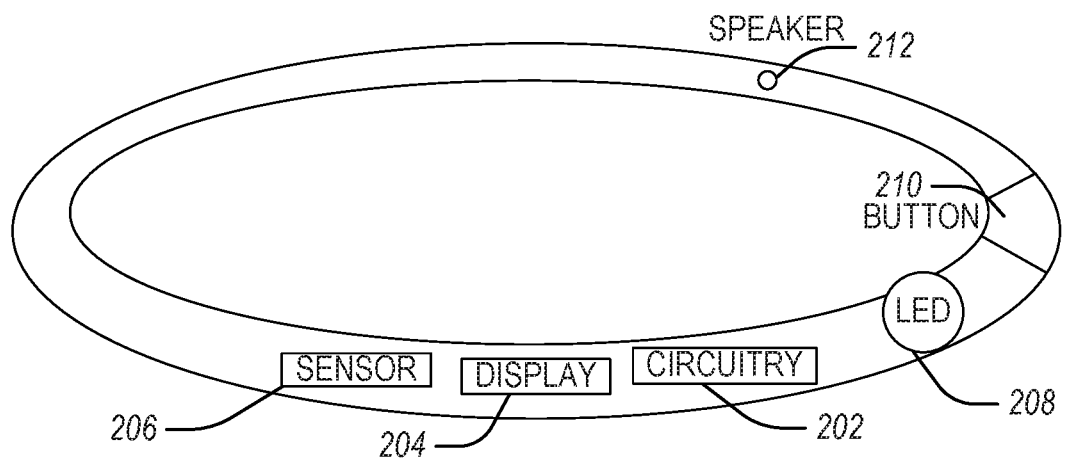
FIG. 2 illustrates an example wearable device in accordance an example.

FIG. 2 illustrates an example wearable device 200 in accordance with some embodiments. The wearable device 200 may include circuitry 202. In an example, the wearable device 200 includes an LED 208. The LED 208 may include a plurality of LEDs. The wearable device 200 may include a display 204, a sensor 206, or a button 210 (e.g., a hardware button). The wearable device 200 may include a speaker 212 to produce sound to a user. The circuitry 202 may determine that a triggering gesture has been made by the wearable device. The circuitry 202 may determine that the triggering gesture has been made using data from the sensor 206. In an example, the sensor 206 may include an inertial sensor. In response to determining that the triggering gesture has been made, the circuitry 202 may send an indication to a device with information about the triggering gesture.

In an example, the wearable device 200 may receive, such as using the circuitry 202, an indication from a device (e.g., a mobile device) to generate feedback at the wearable device 200. The feedback may include displaying light using the LED 208 or displaying video or an image using the display 204, sound using the speaker 212, or haptic feedback.

The sensor 206 may be used to take a series of measurements at the wearable device 200. The series of measurements may be sent, using the circuitry 202, to a mobile device, such as a corresponding wirelessly connected phone or a host computer, to determine a gesture has been made using the wearable device 200. The gesture may be used to generate media outputs, such as sound at a speaker, lights, firework, smoke/fog, actions at a plurality of other wearable devices, or the like.

In an example, the button 210 may be used to initiate an action. For example, the button 210 may be used to connect with an external device, such as a mobile phone or host computer. In another example, the button 210 may be used to indicate that the wearable device 200 may receive a media input. The button 210 may be used to place the wearable device 200 in a state to not receive a media input or to override a media input (e.g., to cancel audio or video playing at the wearable device 200).

Figure 3:
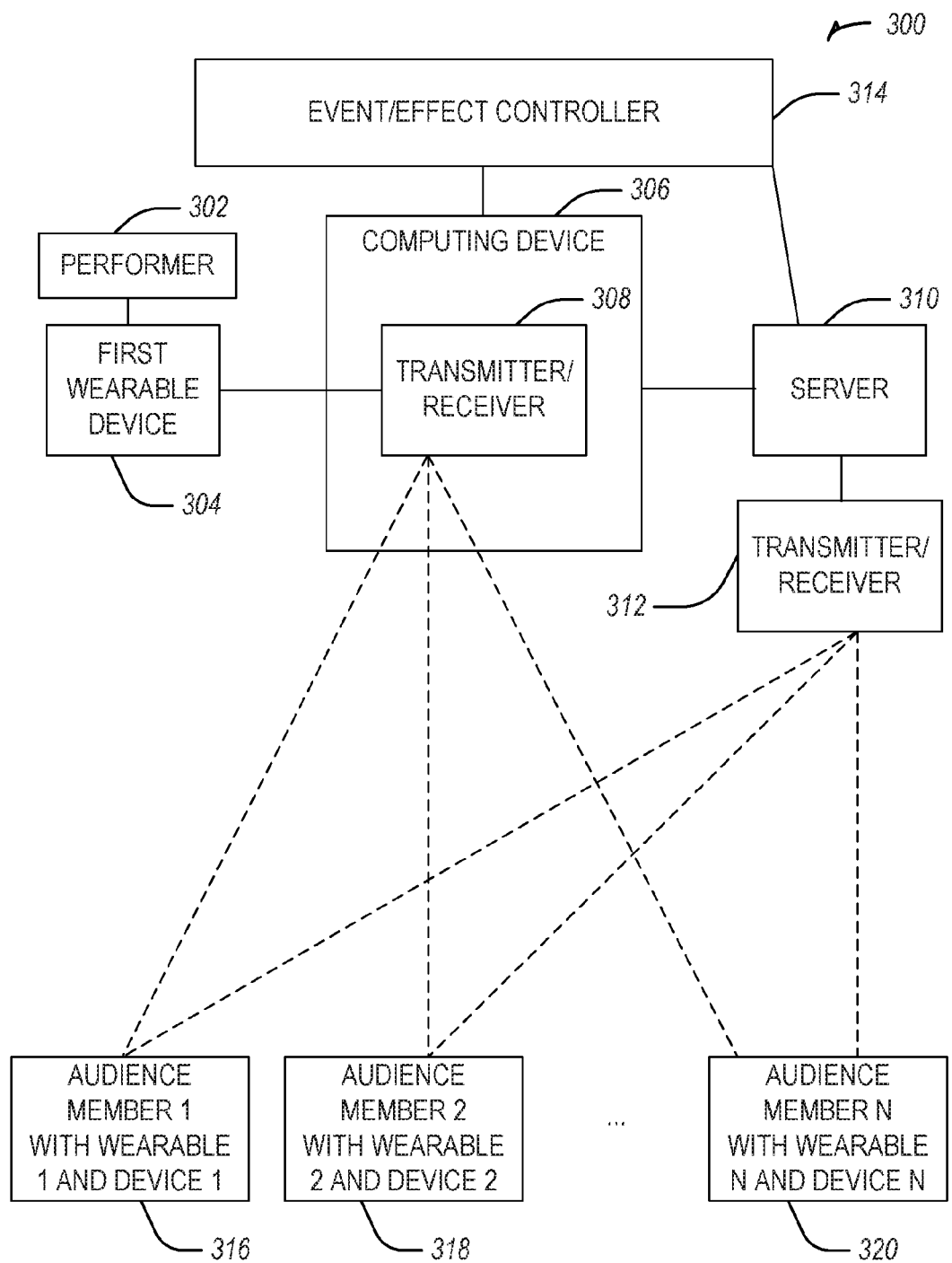
FIG. 3 illustrates a system for controlling output characteristics at a plurality of wearable devices or triggering events in accordance with an example.

FIG. 3 illustrates a system 300 for controlling output characteristics at a plurality of wearable devices or triggering events in accordance with some embodiments. The system 300 includes a performer 302 with a first wearable device 304. The system includes a computing device 306 with a first transmitter/receiver 308 and a server 310 with a second transmitter/receiver 312. The server 310 and the computing device 306 may be electronically (e.g., communicatively) coupled, such as using a wired or wireless connection established with transmitter/receiver 308. In an example, the computing device 306 is a mobile computing device that communicates with the first wearable device 304 using short-range communication technologies such as Wi-Fi, Bluetooth/BLE, or NFC communication, as the computing device 306 collects sensor data. The computing device 306 may then connect to the server 310 via a local area network (LAN) or wide area network. For example, the server 310 may operate a network-accessible service and application programming interface (API) for processing data, receiving and transmitting commands, and exchanging events and indications with the computing device 306.

The computing device 306 or the server 310 may be connected to an events/effect controller 314. For example, the events/effect controller 314 may control various special effects or output mediums such as lights, audio/visual devices (e.g., speakers and video screens), controls for fog, smoke, or fireworks, or the like.

The first transmitter/receiver 308 or the second transmitter/receiver 312 may be wirelessly connected to a plurality of devices (e.g., device 1, device 2, device N of blocks 316-320). For example, the transmitter/receiver 308 may send commands directly from the computing device to the devices 316-320. In another example, the transmitter/receiver 312 may forward commands from the server 310 (or relay commands originating from the computing device 306) to the plurality of devices. The plurality of devices may connect to respectively associated wearable devices, such as those worn by audience members in blocks 316-320.

In a further example, the plurality of wearable devices (and the plurality of devices) such as worn by the audience members in blocks 316-320 may be used to provide feedback to the computing device 306 or the server 310. For example, a plurality of response signals may be received from the plurality of wearable devices (in blocks 316-320), in response to the commands that cause the plurality of wearable devices to generate the output effect. The computing device 306, the server 310, or the event/effect controller 314 may trigger a second output event after receiving the response signals from a threshold number of the plurality of wearable devices (in blocks 316-320). Triggering the second output event may include transmitting instructions to the event/effect controller 314 to control one or more of: lights, fireworks, audio, or visual effects. Thus, a first output event and a second output event may be provided as part of a two-way interaction: the first output event occurring from a performer's wearable device to effect the performance and the performer's interaction with the audience members; and the second output event occurring from audience members' wearable devices to effect special effects that add to the performance.

For example, the second output event may be triggered in response to receiving a plurality of response signals from a threshold number of human users of the plurality of wearable devices. In an example, multiple wearable devices worn by a single user may not contribute more than a single response signal. In an example, the response signals may include gestures performed with the plurality of wearable devices (in blocks 316-320). For example, triggering a second output event may include receiving signals corresponding to a specified gesture from a threshold number of the plurality of wearable devices (in blocks 316-320). The specified gesture may be predefined, determined using the first wearable device (e.g., an example gesture), determined using the computing device 306, the server 310, or based on displayed or audible instructions, such as those that may be shown or heard using the event/effect controller 314 (e.g., displayed or audible in the first output event). In another example, the specified gesture may be determined using a ranking of gestures (e.g., a ranking of a number of response signals that include gestures from set of predefined gestures), such as a highest ranking gesture.

Figure 4:
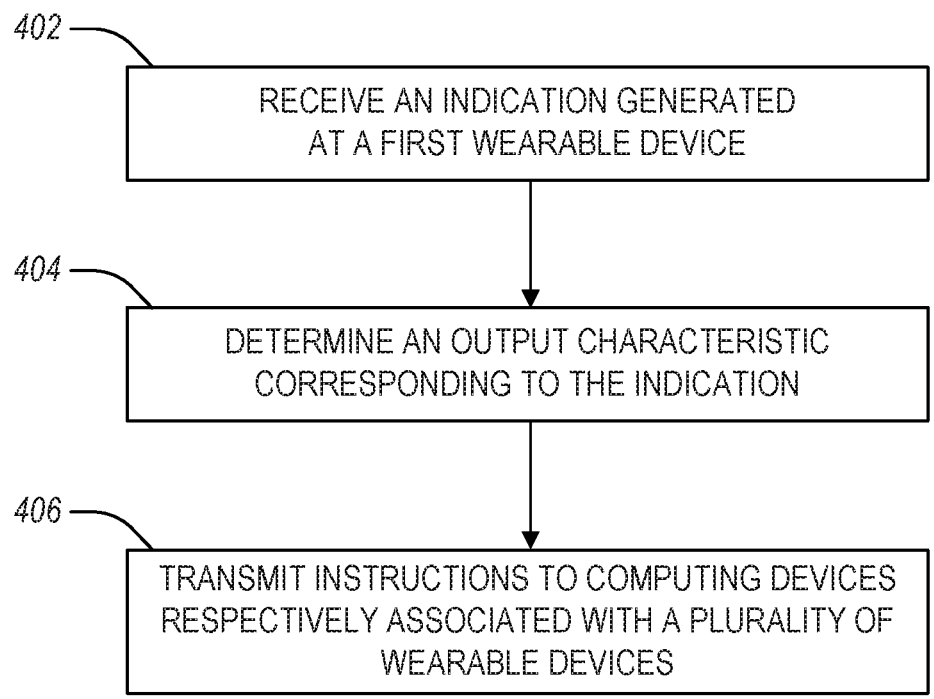
FIG. 4 illustrates a flowchart showing a technique for controlling output characteristics in accordance with an example.

FIG. 4 illustrates a flowchart showing a technique 400 for controlling output characteristics in accordance with an example. The technique 400 may be performed by a computing device, a computing server, features of specialized circuitry in a wearable device, or a combination thereof.

The technique 400 includes an operation 402 to receive an indication generated at a first wearable device. This indication may include information for a triggering gesture, such as a gesture that is indicated by motion characteristics of a human user, detected by the first wearable device (for example, a first wearable device worn by an on-stage musician). This first wearable device may transmit, forward, or begin communication of this indication via a BLE connection to a paired computing device. In a further example, the wearable device may also transmit, forward, or begin communication of this indication via a 900 MHz radio communication. In a further example, the wearable device may also transmit, forward, or begin communication of this indication via an Ultra-wideband (UWB) communication. In a further example, the communication of this indication may be transmitted by two or more of 900 MHz, UWB, or BLE connections for redundancy and robustness of communication.

The technique 400 includes an operation 404 to determine an output effect or like characteristic corresponding to the indication. In an example, the operation 404 determines an output effect in response to performing drift compensation on sensor data from the first wearable device. For example, the sensor data may include motion characteristics that are provided from direction measurements, acceleration measurements, rotation measurements, or magnetic field measurements of the triggering gesture collected in sensor data from the first wearable device. As an additional example, the types of specific triggering gestures that may be detected may include: a down impulse of a user in the direction of gravity; a side impulse to the right or left of the user; a twist of wrist/forearm of the user; a stomping with a leg of the user; a down impulse with a user's arm (e.g., close to the torso or away from torso); or like movements that may occur during a performance or that are specialized to certain human actions. Also as a further example, a wearable device may also send gesture "primitives", which may represent data or other information pertaining to specific raw sensor data values (e.g., rotation, acceleration, location) of that particular wearable device. In an example, such primitives may not represent triggering gestures by themselves, but can be combined in later computing or effects processing with other sensor data or triggering gesture indications to create or identify specific effects. Examples of such primitives may include: vertical inclination of an arm/leg of a user; movements of a wrist of a user; a horizontal angle of an arm/leg of a user; a wrist angle while twisting an arm/leg of a user; or the like. In further examples, such primitives may be used to build "new" instruments that are based on specific types and performances of gestures.

The technique 400 includes an operation 406 to transmit instructions to computing devices respectively associated with a plurality of wearable devices. In an example, the first wearable device is operated by a first human user, while the plurality of wearable devices are operated by respective users of a plurality of other human users. Also in an example, the first wearable device may be a band or bracelet worn by the first human user, whereas the plurality of wearable devices may be bands or bracelets worn by the respective users of the plurality of other human users.

In a further example, the triggering gesture is a personalized gesture, which is pre-programmed to be specific to a human user. The triggering gesture may include various movement characteristics such as a downward movement, a horizontal swipe, or a twist movement that is specific to a human user or group of human user. Other variations to detected movement characteristics that are detectable by sensors and processing circuitry of wearable devices may also be evaluated separately or in combination with triggering gestures.

In a further example, the wearable device may send periodic "localization beacons" to the computing system (e.g., with a UWB communication) which helps ascertain the wearable device location within a performance stage or other defined area. This may allow the triggering gesture to be interpreted both in local contexts (e.g., a direction/acceleration of the wearable device) and global contexts (e.g., an absolute position inside the room) contexts while being used to generate audio-visual-theatrical effects. For example, with use of indoor location technologies such as may be enabled with use of UWB anchors/tags, gestures for "air" drums may be correlated to specific gestures for musical instrument outputs.

Figure 5:
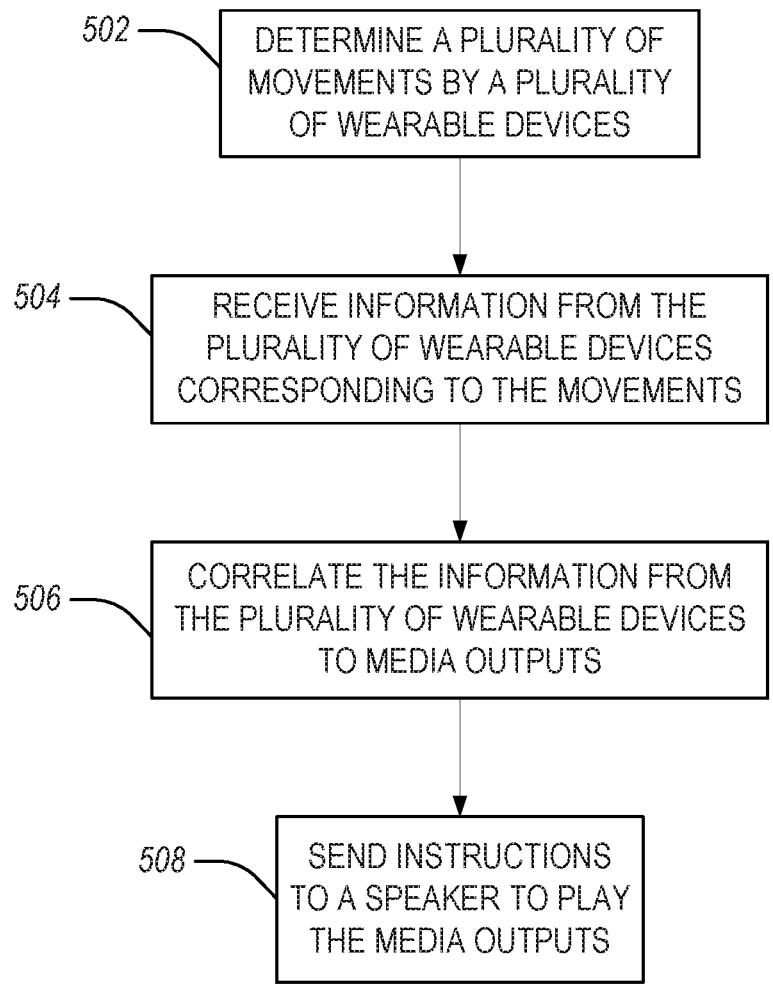
FIG. 5 illustrates a flowchart showing a technique for controlling media outputs using wearable devices in accordance with an example.

FIG. 5 illustrates a flowchart showing a technique 500 for controlling output effects using wearable devices in accordance with some embodiments. The technique may be performed by a device, such as a server, mobile device, computer, or wearable device. The technique 500 includes an operation 502 to determine a plurality of movements by a plurality of wearable devices. The plurality of wearable devices may include devices worn by a plurality of users. In an example, the plurality of wearable devices are worn by a single user. The plurality of wearable devices may be connected to a plurality of devices, such as mobile devices (e.g., tablets or phones), computers, or relays. The plurality of devices may be connected to the device performing the technique 500.

The technique 500 includes an operation 504 to receive information from the plurality of wearable devices corresponding to the movements. The information may include gestures performed by the plurality of wearable devices. In an example, the technique 500 may include classifying gestures. The gestures may be classified based on type of gesture (e.g., arm raised, arm twisted, foot stomped, etc.), time the gesture was received, or intensity of the gesture (e.g., force used to make gesture). Gestures may be aggregated, such as based on type, and the aggregated gesture types may be ranked. For example, a first number of the wearable devices may have made a first gesture and a second number (e.g., less than the first number) of the wearable devices may have made a second gesture. In an example, the ranking may affect which triggered events occur or an aspect of the triggered event.

The technique 500 includes an operation 506 to correlate the information from the plurality of wearable devices to output effects. In an example, the output effects may include notes, instruments, chords, songs, or other audio outputs. In another example, the output effects may correlate with visible outputs, such as lights, smoke or fog, fireworks, video, or the like. The output effects may correspond with MIDI files, MIDI notes, or MIDI instruments. The correlation may depend on a gesture included in the information. For example, a first gesture may correspond to a first output effect and a second gesture may correspond to a second output effect. In another example, the correlation may depend on a specified wearable device of the plurality of wearable devices, which may be included in the information. For example, a first wearable device may correspond with a first instrument (e.g., a drum), and a second wearable device may correspond with a second instrument (e.g., a guitar). The wearable devices with corresponding instruments may be predefined or may be dynamic, such as based on user selections.

The technique 500 includes an operation 508 to send instructions to a speaker to play the output effects. The operation 508 may include displaying visual outputs on a display, using lights, or via fireworks. The output effects may be combined before being played on the speaker. For example, the plurality of wearable devices may correspond to a plurality of instruments, and the information may include a plurality of gestures made at the plurality of wearable devices. The plurality of gestures may correlate to a plurality of output effects, such as musical notes. The musical notes may be played at the speaker using MIDI files corresponding to the plurality of instruments.

In an example, the plurality of wearable devices may include a first wearable device corresponding to a guitar and a second wearable device corresponding to a bass. The technique 500 may include receiving information including a first gesture made by the first wearable device and a second gesture made by the second wearable device. The first gesture may correlate to a first MIDI note and the second gesture may correlate to a second MIDI note. The first MIDI note may be played using a MIDI guitar note and the second MIDI note may be played using a MIDI bass note. The first and second MIDI notes may be played simultaneously at the speaker, to simulate a live band. The technique 500 may be iterated, such as to simulate a song being played live.

Further extensions of the presently disclosed techniques may be used to implement other type of musical instruments and musical performance actions with the presently disclosed trigger gestures and gesture data processing. Some specific examples may include: the use of air drums with 9 axis drums, using a magnetometer to detect a horizontal angle of performance; the use of air drums with gyro-based 3-axis gestures, for 3-position drums; the use of other tags on a performer's body to build relative instruments, such as air drums that move with the artist; the use of multiple tags on dancers and musicians to track motion and create special effects; and like variations using wearable devices, tags, and other location-based mechanisms.

Figure 6:
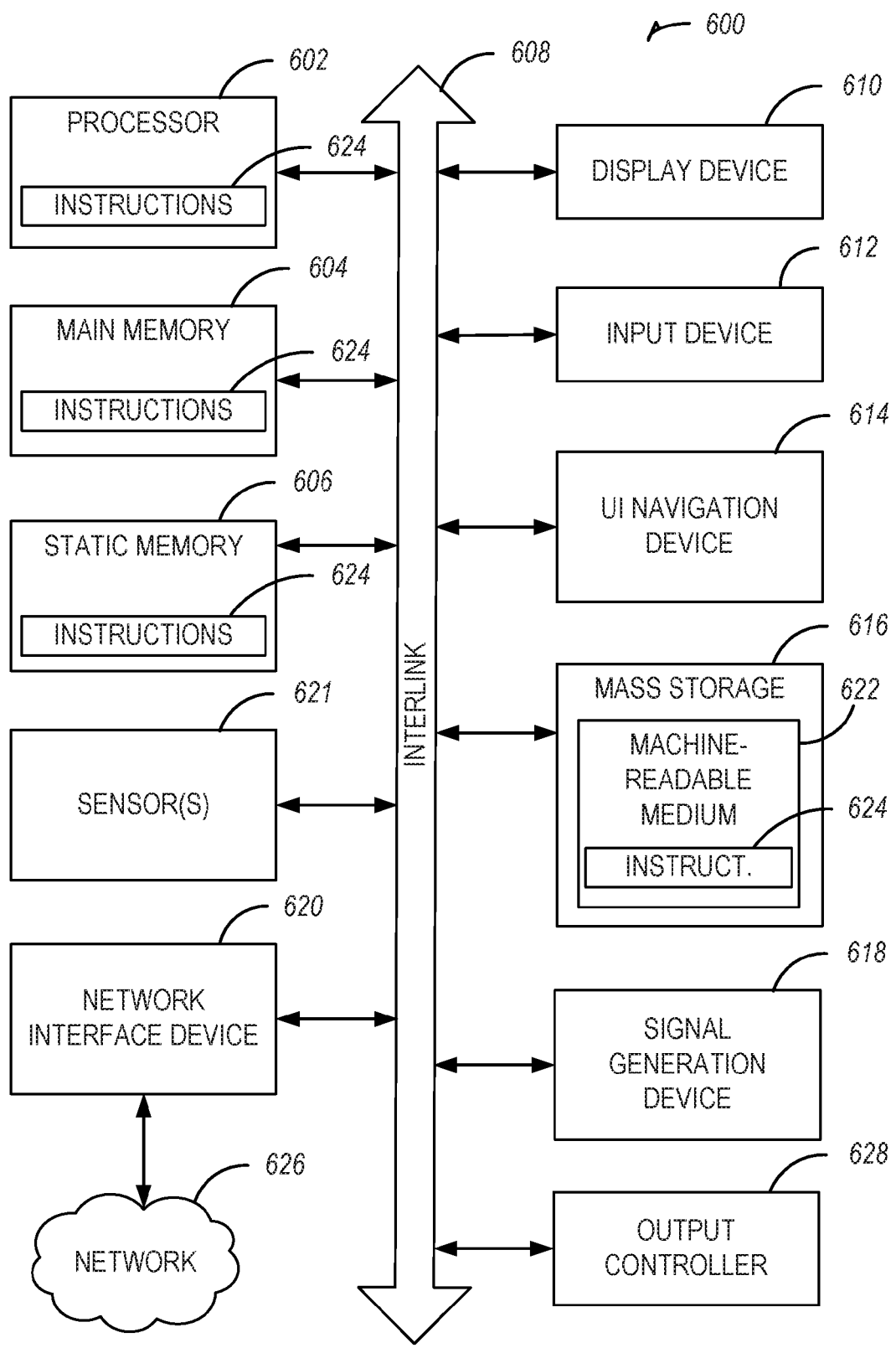
FIG. 6 illustrates generally an example of a block diagram of a machine upon which any one or more of the techniques (e.g., methodologies) discussed herein may perform in accordance with an example.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a method, comprising electronic operations, which when performed by circuitry of a computing system, causes the computing system to perform the electronic operations including: receiving an indication of a triggering gesture occurring with use of a first wearable device, wherein the triggering gesture is indicated by motion characteristics detected by the first wearable device; determining an output effect corresponding to the indication of the triggering gesture; and in response to determining the output effect, transmitting commands to a plurality of computing devices respectively associated with a plurality of wearable devices, wherein the commands cause the plurality of wearable devices to generate the output effect.

In Example 2, the subject matter of Example 1 optionally includes wherein the indication of the triggering gesture is transmitted from the first wearable device to the computing system using a Bluetooth Low Energy (BLE) connection.

In Example 3, the subject matter of Example 2 optionally includes wherein the indication of the triggering gesture is transmitted from the first wearable device to the computing system using a 900 MHz band radio connection.

In Example 4, the subject matter of any one or more of Examples 2-3 optionally include wherein the indication of the triggering gesture is transmitted from the first wearable device to the computing system using an Ultra-wideband (UWB) connection.

In Example 5, the subject matter of Example 4 optionally includes wherein the indication of the triggering gesture is transmitted via two or more of: the BLE connection, the UWB connection, or a 900 MHz band radio connection for redundancy.

In Example 6, the subject matter of any one or more of Examples 1-5 optionally include wherein determining the output effect is performed in response to performing drift compensation on sensor data from the first wearable device, wherein the sensor data is included in the indication of the triggering gesture.

In Example 7, the subject matter of any one or more of Examples 1-6 optionally include wherein the motion characteristics are provided from one or more of: direction measurements, acceleration measurements, rotation measurements, or magnetic field measurements, of the triggering gesture collected in sensor data from the first wearable device.

In Example 8, the subject matter of Example 7 optionally includes wherein the triggering gesture is a personalized gesture, the personalized gesture being programmed in the computing system to be specific to a human user of the first wearable device.

In Example 9, the subject matter of any one or more of Examples 7-8 optionally include wherein the triggering gesture includes one or more of: a downward movement, a horizontal swipe, or a twist movement by a human user of the first wearable device.

In Example 10, the subject matter of any one or more of Examples 1-9 optionally include correlating the output effect to a Musical Instrument Digital Interface (MIDI) note in a musical arrangement; and changing one or more of volume, pitch, or notation of the MIDI note in the musical arrangement.

In Example 11, the subject matter of any one or more of Examples 1-10 optionally include determining that the indication of the triggering gesture corresponds to a MIDI instrument and a MIDI note; and playing the MIDI note on the MIDI instrument.

In Example 12, the subject matter of Example 11 optionally includes receiving a second indication from a second wearable device; determining that the second indication corresponds to a second MIDI instrument and a second MIDI note; and wherein playing the MIDI note includes playing the second MIDI note on the second MIDI instrument.

In Example 13, the subject matter of any one or more of Examples 1-12 optionally include wherein the first wearable device is operated by a first human user, and wherein the plurality of wearable devices are operated by respective users of a plurality of other human users.

In Example 14, the subject matter of Example 13 optionally includes wherein the first wearable device is a band or bracelet worn by the first human user, and wherein the plurality of wearable devices are bands or bracelets worn by the respective users of the plurality of other human users.

In Example 15, the subject matter of any one or more of Examples 1-14 optionally include receiving a plurality of response signals from the plurality of wearable devices, in response to the plurality of wearable devices generating the output effect; determining a second output effect corresponding to the plurality of response signals; and triggering a second output event in response to receiving the plurality of response signals from a threshold number of human users of the plurality of wearable devices.

In Example 16, the subject matter of Example 15 optionally includes wherein triggering the second output event includes transmitting instructions to an effects controller to control one or more of: lights, fireworks, audio, or visual effects.

In Example 17, the subject matter of any one or more of Examples 1-16 optionally include wherein the output effect includes one or more of: haptic feedback, light, or sound.

Example 18 is a machine readable medium including instructions, which when executed by a computing system, cause the computing system to perform any of the methods of Examples 1-17.

Example 19 is an apparatus comprising means for performing any of the methods of Examples 1-17.

Example 20 is a computing device comprising: at least one hardware processor to perform electronic operations that: decode an indication from a first wearable device, wherein the indication is of a triggering gesture indicated by motion characteristics detected by the first wearable device; determine an output effect corresponding to the indication of the triggering gesture; and transmit commands to a plurality of computing devices respectively associated with a plurality of wearable devices, in response to a determination of the output effect, wherein the commands cause the plurality of wearable devices to generate the output effect.

In Example 21, the subject matter of Example 20 optionally includes wherein the hardware processor is to perform further electronic operations that: perform drift compensation on sensor data, to determine the output effect, the sensor data included in the indication from the first wearable device.

In Example 22, the subject matter of any one or more of Examples 20-21 optionally include wherein the hardware processor is to perform further electronic operations that: receive a plurality of response signals from the plurality of wearable devices, in response to the commands that cause the plurality of wearable devices to generate the output effect; and trigger a second output event in response to receipt of the plurality of response signals from a threshold number of the plurality of wearable devices.

In Example 23, the subject matter of any one or more of Examples 20-22 optionally include wherein the hardware processor is to perform further electronic operations that: transmit instructions to an effects controller to control one or more of: lights, fireworks, audio, or visual effects.

In Example 24, the subject matter of any one or more of Examples 20-23 optionally include wherein the hardware processor is to perform further electronic operations that: correlate the output effect to a Musical Instrument Digital Interface (MIDI) note in a musical arrangement; and change one or more of volume, pitch, or notation of the MIDI note in the musical arrangement.

Example 25 is at least one machine-readable medium including instructions for operation of a computing system, which when executed by the computing system, cause the computing system to perform electronic operations comprising: receive an indication of a triggering gesture from use of a first wearable device, wherein the triggering gesture is indicated by motion characteristics detected by the first wearable device; determine an output effect corresponding to the indication of the triggering gesture; and transmit commands to a plurality of computing devices respectively associated with a plurality of wearable devices, in response to a determination of the output effect, wherein the commands cause the plurality of wearable devices to generate the output effect.

In Example 26, the subject matter of Example 25 optionally includes wherein the instructions further cause the computing system to perform electronic operations that: perform drift compensation on sensor data, to determine the output effect, the sensor data included in the indication from the first wearable device.

In Example 27, the subject matter of any one or more of Examples 25-26 optionally include wherein the instructions further cause the computing system to perform electronic operations that: receive a plurality of response signals from the plurality of wearable devices, in response to the commands that cause the plurality of wearable devices to generate the output effect; and trigger a second output event in response to receipt of the plurality of response signals from a threshold number of the plurality of wearable devices.

In Example 28, the subject matter of any one or more of Examples 25-27 optionally include wherein the instructions further cause the computing system to perform electronic operations that: transmit instructions to an effects controller to control one or more of: lights, fireworks, audio, or visual effects.

In Example 29, the subject matter of any one or more of Examples 25-28 optionally include wherein the instructions further cause the computing system to perform electronic operations that: correlate the output effect to a Musical Instrument Digital Interface (MIDI) note in a musical arrangement; and change one or more of volume, pitch, or notation of the MIDI note in the musical arrangement.

Example 30 is a system, comprising: a server, comprising at least one hardware processor to perform electronic operations that: receive an indication from a computing device connected to the server, wherein the indication is of a triggering gesture indicated by motion characteristics detected by a first wearable device, wherein the computing device transmits sensor data for the first wearable device to the server; determine an output effect corresponding to the indication of the triggering gesture; and transmit commands to a plurality of computing devices respectively associated with a plurality of wearable devices, in response to a determination of the output effect, wherein the commands cause the plurality of wearable devices to generate the output effect.

In Example 31, the subject matter of Example 30 optionally includes wherein the hardware processor is to perform further electronic operations that: perform drift compensation on the sensor data, to determine the output effect, the sensor data included in the indication from the computing device.

In Example 32, the subject matter of any one or more of Examples 30-31 optionally include wherein the hardware processor is to perform further electronic operations that: receive a plurality of response signals from the plurality of wearable devices, in response to the commands that cause the plurality of wearable devices to generate the output effect; and trigger a second output event in response to receipt of the plurality of response signals from a threshold number of the plurality of wearable devices.

In Example 33, the subject matter of any one or more of Examples 30-32 optionally include wherein the hardware processor is to perform further electronic operations that: transmit instructions to an effects controller to control one or more of: lights, fireworks, audio, or visual effects.

In Example 34, the subject matter of any one or more of Examples 30-33 optionally include wherein the hardware processor is to perform further electronic operations that: correlate the output effect to a Musical Instrument Digital Interface (MIDI) note in a musical arrangement; and change one or more of volume, pitch, or notation of the MIDI note in the musical arrangement.

In Example 35, the subject matter of any one or more of Examples 30-34 optionally include the first wearable device and the computing device, the first wearable device communicatively coupled to the computing device via two or more of: a Bluetooth Low Energy (BLE) connection, an Ultra-wide band (UWB) connection, or a 900 MHz band radio connection, and the computing device communicatively coupled to the server via a local area network (LAN) or wide area network (WAN) connection.

In Example 36, the subject matter of any one or more of Examples 30-35 optionally include the computing device, the computing device to receive the indication from the first wearable device and forward the indication to the server.

In Example 37, the subject matter of any one or more of Examples 30-36 optionally include a transmitter, wherein the commands that are transmitted to the plurality of computing devices are transmitted by the server via the transmitter.

In Example 38, the subject matter of Example 37 optionally includes wherein the transmitter is to broadcast the commands to the plurality of computing devices in an information broadcast.

In Example 39, the subject matter of any one or more of Examples 30-38 optionally include a receiver to: receive a plurality of response signals from the plurality of computing devices respectively associated with the plurality of wearable devices; and trigger a response event in response to receiving the plurality of response signals from a threshold number of the plurality of computing devices.

In Example 40, the subject matter of Example 39 optionally includes wherein to perform the response event, the receiver is to receive a second indication from the server to trigger the response event.

In Example 41, the subject matter of any one or more of Examples 39-40 optionally include a speaker, wherein the response event includes music to output via the speaker.

Example 42 is an apparatus, comprising: means for receiving an indication of a triggering gesture occurring with use of a first wearable device, wherein the triggering gesture is indicated by motion characteristics detected by the first wearable device; means for determining an output effect corresponding to the indication of the triggering gesture; and means for transmitting commands to a plurality of computing devices respectively associated with a plurality of wearable devices, in response to determining the output effect, wherein the commands cause the plurality of wearable devices to generate the output effect.

In Example 43, the subject matter of Example 42 optionally includes means for receiving the indication of the triggering gesture from the first wearable device using a Bluetooth Low Energy (BLE) connection.

In Example 44, the subject matter of any one or more of Examples 42-43 optionally include means for receiving the indication of the triggering gesture from the first wearable device using a Ultra-wide band (UWB) connection.

In Example 45, the subject matter of any one or more of Examples 42-44 optionally include means for receiving and processing a localization beacon from the first wearable device transmitted via a Ultra-wide band (UWB) connection.

In Example 46, the subject matter of any one or more of Examples 42-45 optionally include means for receiving the indication of the triggering gesture from the first wearable device using a 900 MHz band radio connection.

In Example 47, the subject matter of any one or more of Examples 42-46 optionally include means for performing drift compensation on sensor data from the first wearable device, wherein the sensor data is included in the indication of the triggering gesture.

In Example 48, the subject matter of any one or more of Examples 42-47 optionally include means for correlating the output effect to a Musical Instrument Digital Interface (MIDI) note in a musical arrangement; and means for changing one or more of volume, pitch, or notation of the MIDI note in the musical arrangement.

In Example 49, the subject matter of any one or more of Examples 42-48 optionally include means for determining that the indication of the triggering gesture corresponds to a MIDI instrument and a MIDI note; and means for outputting the MIDI note on the MIDI instrument.

In Example 50, the subject matter of Example 49 optionally includes means for receiving a second indication from a second wearable device; and means for determining that the second indication corresponds to a second MIDI instrument and a second MIDI note, wherein outputting the MIDI note includes outputting the second MIDI note on the second MIDI instrument.

In Example 51, the subject matter of any one or more of Examples 42-50 optionally include means for generating one or more of: haptic feedback, light, or sound, for the output effect.

In Example 52, the subject matter of any one or more of Examples 42-51 optionally include means for receiving a plurality of response signals from the plurality of wearable devices, in response to the plurality of wearable devices generating the output effect; means for determining a second output effect corresponding to the plurality of response signals; and means for triggering a second output event in response to receiving the plurality of response signals from a threshold number of human users of the plurality of wearable devices.

In Example 53, the subject matter of any one or more of Examples 42-52 optionally include means for triggering the second output event with one or more of: lights, fireworks, audio, or visual effects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A computing device comprising:
   at least one hardware processor to perform electronic operations that:
   decode an indication from a first wearable device, wherein the indication is of a triggering gesture indicated by motion characteristics detected by the first wearable device;
   determine an output effect corresponding to the indication of the triggering gesture; and
   transmit commands to a plurality of computing devices respectively associated with a plurality of wearable devices, in response to a determination of the output effect, wherein the commands cause the plurality of wearable devices to generate the output effect.

2. The computing device of claim 1, wherein the hardware processor is to perform further electronic operations that:
   perform drift compensation on sensor data, to determine the output effect, the sensor data included in the indication from the first wearable device.

3. The computing device of claim 1, wherein the hardware processor is to perform further electronic operations that:
   receive a plurality of response signals from the plurality of wearable devices, in response to the commands that cause the plurality of wearable devices to generate the output effect; and
   trigger a second output event in response to receipt of the plurality of response signals from a threshold number of the plurality of wearable devices.

4. The computing device of claim 1, wherein the hardware processor is to perform further electronic operations that:
   transmit instructions to an effects controller to control one or more of: lights, fireworks, audio, or visual effects.

5. A method, comprising electronic operations, which when performed by circuitry of a computing system, causes the computing system to perform the electronic operations including:
   receiving an indication of a triggering gesture occurring with use of a first wearable device, wherein the triggering gesture is indicated by motion characteristics detected by the first wearable device;

determining an output effect corresponding to the indication of the triggering gesture; and in response to determining the output effect, transmitting commands to a plurality of computing devices respectively associated with a plurality of wearable devices, wherein the commands cause the plurality of wearable devices to generate the output effect.

6. The method of claim 5, wherein the indication of the triggering gesture is transmitted from the first wearable device to the computing system using a Bluetooth Low Energy (BLE) connection.

7. The method of claim 6, wherein the indication of the triggering gesture is transmitted from the first wearable device to the computing system using a 900 MHz band radio connection.

8. The method of claim 6, wherein the indication of the triggering gesture is transmitted from the first wearable device to the computing system using an Ultra-wideband (UWB) connection.

9. The method of claim 8, wherein the indication of the triggering gesture is transmitted via two or more of: the BLE connection, the UWB connection, or a 900 MHz band radio connection for redundancy.

10. The method of claim 5, wherein determining the output effect is performed in response to performing drift compensation on sensor data from the first wearable device, wherein the sensor data is included in the indication of the triggering gesture.

11. The method of claim 5, wherein the motion characteristics are provided from one or more of: direction measurements, acceleration measurements, rotation measurements, or magnetic field measurements, of the triggering gesture collected in sensor data from the first wearable device.

12. The method of claim 11, wherein the triggering gesture is a personalized gesture, the personalized gesture being programmed in the computing system to be specific to a human user of the first wearable device.

13. The method of claim 11, wherein the triggering gesture includes one or more of: a downward movement, a horizontal swipe, or a twist movement by a human user of the first wearable device.

14. The method of claim 5, further comprising:
correlating the output effect to a Musical Instrument Digital Interface (MIDI) note in a musical arrangement; and
changing one or more of volume, pitch, or notation of the MIDI note in the musical arrangement.

15. The method of claim 5, further comprising:
determining that the indication of the triggering gesture corresponds to a MIDI instrument and a MIDI note; and
playing the MIDI note on the MIDI instrument.

16. The method of claim 15, further comprising:
receiving a second indication from a second wearable device;
determining that the second indication corresponds to a second MIDI instrument and a second MIDI note; and
wherein playing the MIDI note includes playing the second MIDI note on the second MIDI instrument.

17. The method of claim 5, wherein the first wearable device is operated by a first human user, and wherein the plurality of wearable devices are operated by respective users of a plurality of other human users.

18. The method of claim 17, wherein the first wearable device is a band or bracelet worn by the first human user, and wherein the plurality of wearable devices are bands or bracelets worn by the respective users of the plurality of other human users.

19. The method of claim 5, further comprising:
receiving a plurality of response signals from the plurality of wearable devices, in response to the plurality of wearable devices generating the output effect;
determining a second output effect corresponding to the plurality of response signals; and
triggering a second output event in response to receiving the plurality of response signals from a threshold number of human users of the plurality of wearable devices.

20. The method of claim 19, wherein triggering the second output event includes transmitting instructions to an effects controller to control one or more of: lights, fireworks, audio, or visual effects.

21. The method of claim 5, wherein the output effect includes one or more of: haptic feedback, light, or sound.

22. At least one non-transitory machine-readable medium including instructions for operation of a computing system, which when executed by the computing system, cause the computing system to perform electronic operations comprising:
receive an indication of a triggering gesture from use of a first wearable device, wherein the triggering gesture is indicated by motion characteristics detected by the first wearable device;
determine an output effect corresponding to the indication of the triggering gesture; and
transmit commands to a plurality of computing devices respectively associated with a plurality of wearable devices, in response to a determination of the output effect, wherein the commands cause the plurality of wearable devices to generate the output effect.

23. The at least one non-transitory machine-readable medium of claim 22, wherein the instructions further cause the computing system to perform electronic operations that:
perform drift compensation on sensor data, to determine the output effect, the sensor data included in the indication from the first wearable device.

24. The at least one non-transitory machine-readable medium of claim 22, wherein the instructions further cause the computing system to perform electronic operations that:
receive a plurality of response signals from the plurality of wearable devices, in response to the commands that cause the plurality of wearable devices to generate the output effect; and
trigger a second output event in response to receipt of the plurality of response signals from a threshold number of the plurality of wearable devices.

25. The at least one non-transitory machine-readable medium of claim 22, wherein the instructions further cause the computing system to perform electronic operations that:
transmit instructions to an effects controller to control one or more of: lights, fireworks, audio, or visual effects.

* * * * *